US007002578B1

(12) United States Patent
Ritter

(10) Patent No.: US 7,002,578 B1
(45) Date of Patent: Feb. 21, 2006

(54) METHOD OF OBTAINING A THREE-DIMENSIONAL MAP REPRESENTATION AND NAVIGATION SYSTEM

(75) Inventor: Dieter Ritter, Regensburg (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 09/959,727

(22) PCT Filed: May 5, 2000

(86) PCT No.: PCT/DE00/01422

§ 371 (c)(1),
(2), (4) Date: Nov. 5, 2001

(87) PCT Pub. No.: WO00/66977

PCT Pub. Date: Nov. 9, 2000

(30) Foreign Application Priority Data

May 5, 1999 (DE) .................................. 199 20 709

(51) Int. Cl.
*G06T 15/20* (2006.01)

(52) U.S. Cl. ..................... 345/427; 345/419; 345/441; 345/442; 345/586; 345/647

(58) Field of Classification Search .................. 345/427, 345/419, 441, 442, 586, 647; 701/209; 340/990

See application file for complete search history.

(56) References Cited

U.S. PATENT DOCUMENTS

| 4,841,292 A | * | 6/1989 | Zeno .......................... 345/419 |
| 5,742,924 A | | 4/1998 | Nakayama |
| 5,757,290 A | | 5/1998 | Watanabe et al. |
| 6,169,552 B1 | * | 1/2001 | Endo et al. .................. 345/427 |
| 6,282,490 B1 | * | 8/2001 | Nimura et al. ......... 340/995.14 |
| 6,611,753 B1 | * | 8/2003 | Millington ................... 701/209 |

FOREIGN PATENT DOCUMENTS

| EP | 0 378 271 A1 | | 7/1990 |
| EP | 378271 A1 | * | 7/1990 |
| EP | 0 660 290 A1 | | 6/1995 |
| EP | 0 752 687 A2 | | 2/1997 |
| EP | 0 802 516 A2 | | 10/1997 |
| EP | 0 802 516 A3 | | 10/1997 |
| EP | 0 881 466 A1 | | 12/1998 |

OTHER PUBLICATIONS

"Photorealistic Terrain Imaging and Flight Simulation" by Daniel Cohen et al.; *IEEE Computer Graphics and Applications*; c. 1994.

* cited by examiner

*Primary Examiner*—Kimbinh T. Nguyen
(74) *Attorney, Agent, or Firm*—Morrison & Foerster LLP

(57) ABSTRACT

In a method for obtaining a three-dimensional map representation for a navigation system from digital, two-dimensional road map data, the road map data for a field of view that is to be represented and has a predetermined visual range are curved in a radially symmetric fashion about a virtual viewpoint by means of a polynomial transformation. A navigation system suitable for generating such a map representation is distinguished by a conversion unit with the aid of which two-dimensional road map data can be transferred into a view curved in a radially symmetric fashion.

10 Claims, 7 Drawing Sheets

METHOD OF OBTAINING A THREE-DIMENSIONAL MAP REPRESENTATION AND NAVIGATION SYSTEM

CLAIM FOR PRIORITY

This application claims priority to International Application No. PCT/DE00/01422, which was published in the German language on May 5, 2000, and which claims the benefit of priority to German Application No. 199 207 09.7, filed in the German language on May 5, 1999.

The invention relates to obtaining a three-dimensional representation for a navigation system from two-dimensional road map data, and to a navigation system which generates a three-dimensional representation.

BACKGROUND OF THE INVENTION

Digital road maps for navigation systems comprise two-dimensional networks of road segments. A three-dimensional map output is desirable for the purpose of better orientation, particularly in the case of a map representation on a large scale.

U.S. Pat. No. 5,757,290 discloses a navigation system which represents a road map from a bird's-eye perspective. The three-dimensional effect is supported by the use of colored variations dependent on distance.

Patent application EP 0 660 290 A1 relates to a three-dimensional representation from a bird's-eye perspective, in which different scales are used for a near zone and a far zone.

Patent application EP 0 752 687 A2 discloses a three-dimensional (3D) representation from a bird's-eye perspective for navigation systems, in the case of which application the transformation of digital road map data into the bird's-eye perspective is optimized by means of conversion tables.

The representation of a road map in the bird's-eye perspective is performed by a perspective projection which is performed from a virtual, elevated viewpoint. The result is to produce a pseudo-3D effect which causes the plane to run together into a vanishing point. Thus, no actual 3D information is used, but the plane is still flat.

Laid Open patent application DE 198 35 874 A1 discloses a map display apparatus which is intended to render possible on a large-area map a direction-independent feeling for distance in conjunction with dynamic compression of the map edges. A lateral transformation in the plane is undertaken for this purpose. A transformation into the third dimension does not take place.

In one embodiment of the invention, there is a method for obtaining a three-dimensional map representation for a navigation system from two-dimensional road map data having a network of road segments. The method includes, for example, obtaining road map data for a field of view that is to be represented and has a predetermined visual range being curved into the third dimension in a radially symmetric fashion about a virtual viewpoint by a polynomial transformation.

In another aspect of the invention, the virtual viewpoint is determined continuously by the navigation system, and the field of view is moved synchronously with the virtual viewpoint.

In another aspect of the invention, objects are placed in the field of view as three-dimensional geometric bodies.

In yet another aspect of the invention, the objects are provided with a texture.

In another aspect of the invention, the vehicle is represented in the field of view.

In another aspect of the invention, the field of view is illuminated as at least one of a function of the time of day and the curvature of the represented sections.

In still another aspect of the invention, a meshed network is displayed.

In another aspect of the invention, route segments of the road map data are provided with boundary lines, and the boundary lines are distorted into a curved course in the region of juxtaposed road segments.

In another embodiment of the invention, there is a navigation system. The system includes, for example, a display device, a position-determining unit, a storage medium on which two-dimensional road map data is stored with the aid of a network of road segments, and a conversion unit to convert two-dimensional road map data from a field of view and has a predetermined visual range into a view curved in the shape of a dish.

BRIEF DESCRIPTION OF THE DRAWINGS

Further advantages, features and possibilities of application of the invention emerge from the following description of exemplary embodiments in conjunction with the drawings, in which.

DETAILED DESCRIPTION OF THE PREFERRED EMBODIMENTS

Figure 1:
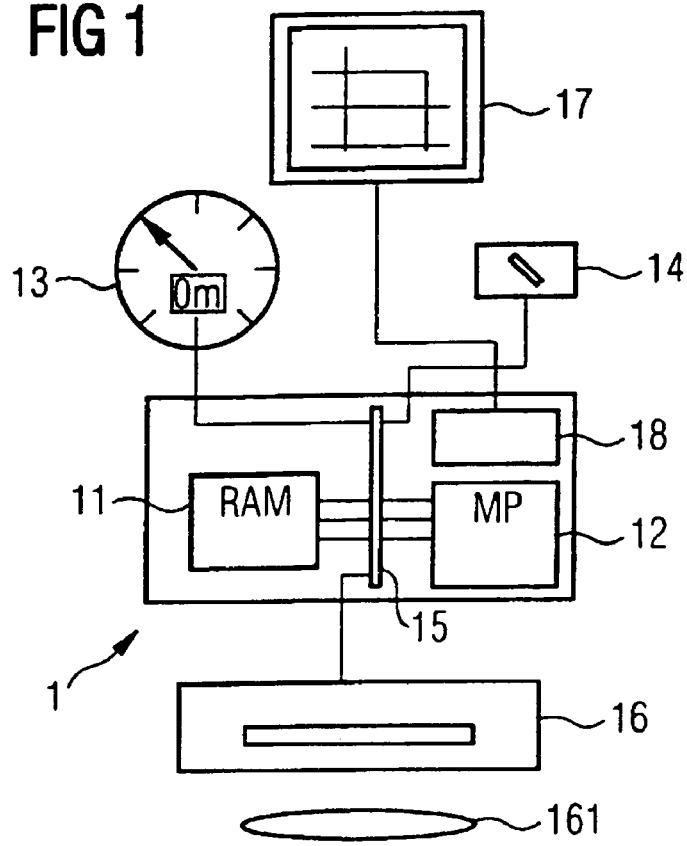
FIG. 1 shows a navigation system.

The invention provides a method for obtaining a three-dimensional representation for a navigation system, and a navigation system, which permit an improved three-dimensional map representation.

A three-dimensional map representation with a particular natural effect is generated by using a polynomial transformation to transfer a plane defined by two-dimensional road map data into the third dimension. The transformation is generated in a radially symmetric fashion above a virtual viewpoint. This produces a three-dimensional distortion of the road map data originally presented in two dimensions.

The artificial curvature or distortion of the two-dimensional road map data and, in particular, of the road network is generated by a nonlinear transformation and a perspective representative from an arbitrary, virtual viewpoint, preferably an instantaneous vehicle position.

A visual range or a horizon can be limited by a circular line, for example. As a result, substantially fewer road map data need be converted into a three-dimensional picture than in the case of a pure perspective projection. The limited field of view results in a clear representation and a pleasant, dynamic 3D impression.

In a particular preferred embodiment, use is made of NURBS (Non-Uniform Rational B-Spline) surfaces are used for graphic display. These subsurfaces can be used for any shape, in particular for the deformed three-dimensional plane including the polygons which represent the roads and intersections in the map representation.

Three-dimensional objects such as vehicles, buildings or other objects are advantageously incorporated into a map representation. These objects can be external objects which are not stored in the same medium as the digital, two-dimensional road map data. The digital road maps are usually only geo information system databases in which geocoordinates of road segments, bodies of water and the like are stored in two dimensions.

Such objects can be stored, for example, as three-dimensional geometric bodies or structures. These bodies can be provided with textures in order to evoke a natural impression. Moreover, the objects can be rotated, for example when an object is passed.

The field of view to be represented and the visual range are advantageously moved synchronously with the virtual viewpoint.

Whereas to date triangles have regularly been used to describe surfaces in the map representation of navigation systems, it is preferable to use NURBS surfaces for the representation of three-dimensional surfaces. The NURBS surfaces can be described with the aid of very few parameters. Instead of a three-dimensional surface with, for example, 500*500 points in the x-y and z-planes being specified by means of triangles, a few parameters typically suffice. These describe in an interpolated fashion the edge of the surfaces (Bezier curves) and the approximate curvature of the original data. Thus, NURBS surfaces can be used for very efficient processing of the generated three-dimensional road map data or road map networks.

The road segments, which are regularly stored only as lines in the digital road map data, are preferably provided with boundary lines. A particularly realistic road view results in this case when the boundary lines in the regions of juxtaposed road segments are distorted into a curved course. This avoids an unnatural, angular representation of juxtaposed roads. The road segments are preferably initially treated in this way and only subsequently distorted into a three-dimensional view by means of a polynomial transformation.

A suitable measure for smoothing corners on juxtaposed road segments is a nonlinear interpolation. It is preferred in this case that points of intersection between road segments or nodes for those points of a boundary line which lie closer to the point of intersection of two road segments to be further distant from the position determined by the digital road map data than are points lying further distant from the point of intersection. Known functions with the aid of which this can be established are, for example, Bézier curves and polynomial interpolations.

It is possible for road segments which are intended to acquire a curved course of the road by means of shape points, to be processed in a corresponding way. The road segments, or their boundary lines, juxtaposed at the shape points are distorted by a nonlinear interpolation in the region around these shape points. By contrast with road segments which are juxtaposed at nodes, the distorted boundary lines should substantially lie on the shape points. That is to say, the boundary lines are not distorted directly at the shape point. The distortion around the shape points is preferably performed with the aid of a spline interpolation.

FIG. 1 illustrates a navigation system 1 having a main memory 11 and a conversion unit 12 constructed as a microprocessor. A distance meter 13 and a direction meter 14 serve for determining position via dead reckoning. Just like the distance meter 13, the direction meter 14 and a drive 16 for a memory medium 161, a GPS sensor (not illustrated) is connected to the microprocessor via a system bus 15.

The memory medium 161 is a DVD (Digital Versatile Disk).

A display device 17 is controlled via an image control unit 18 for outputting image information and, in particular, for representing road maps. The image control unit 18 is connected, in turn, to the microprocessor via the system bus 15.

Figure 2:
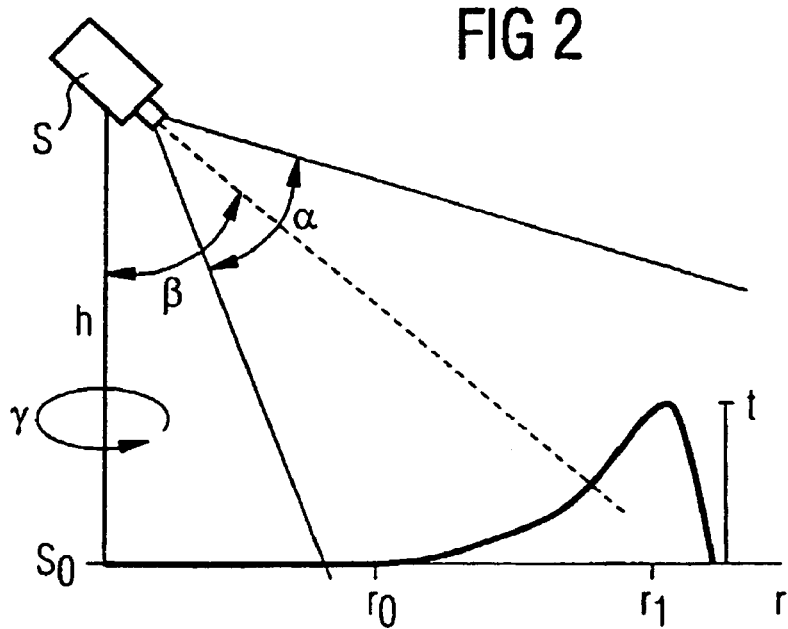
FIG. 2 shows a virtual viewpoint, the starting point for obtaining a three-dimensional map representation.

FIG. 2 illustrates a vehicle position or a viewpoint $S_0$ which is an instantaneous vehicle position determined by the navigation system. Starting from the measured vehicle position, the user of the navigation system is offered a map representation up to an artificial horizon of a height t, this being done from a virtual viewpoint S which is projected with a height h above the viewpoint $S_0$.

An angle of view or a field of view α opens up from the virtual viewpoint S and reaches up to the artificial horizon. The distance $r_1$ up to the horizon, that is to say the visual range, is determined by the camber or curvature of the plane and the start of the camber $r_0$. Only those points from the plane are distorted which are at a distance r from the viewpoint $S_0$ which is situated between $r_0$ and $r_1$.

The height h of the viewpoint S and the inclination β of the field of view α can be selected arbitrarily. γ denotes the direction of view in the representation. This determines the alignment of the field of view α.

The road map data required for the representation are severely limited by the horizon and the appropriate maximum visual range $r_1$ associated therewith.

A plane with road segments whose midpoint is the viewpoint $S_0$ is bent or distorted in a radially symmetric fashion about the viewpoint $S_0$. A nonlinear interpolation of the two-dimensional plane takes place in the third dimension. A polynomial function serves for the transformation.

A z-coordinate is determined for an arbitrary point with the Cartesian coordinates x, y in the plane, in which case $$z = \Sigma_i \, a_i * r^i$$

$$r = [(x-x_p)^2 + (y-y_p)^2]^{1/2},$$

the Cartesian coordinates $x_p$ and $y_p$ reproducing the vehicle position $S_0$ determined by the navigation system. $a_i$ are suitable coefficients with $i \in [1 \ldots n]$.

A suitable polynomial transformation defined in a piecewise fashion and of degree p=6 for achieving a three-dimensional representation is reproduced below:

$$r > r_0: f(r) = -a(r-r_0)^p + c(r-r_0)^2,$$

$$a = \frac{-2t}{(r_1-r_0)^p(2-p)}$$

$$c = \frac{-pt}{(r_1-r_0)^2(2-p)}$$

$$r \leq r_0: f(r) = 0$$

The color of a point transformed into the third dimension remains unchanged, and the texture, that is to say the representation of the roads, is maintained.

The polynomial transformation causes a representation of the field of view α which is cambered or bent like a dish and has a defined, settable visual range $r_1$. This visual range r corresponds to a horizon which moves synchronously with the change in the viewpoint $S_0$.

Figure 3:
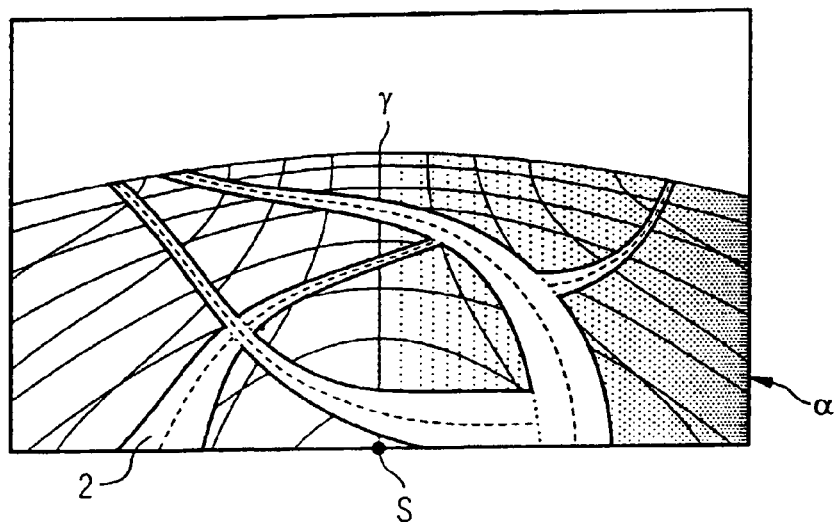
FIG. 3 shows a field of view resulting for the viewpoint of FIG. 1.

FIG. 3 illustrates a field of view α. Starting from the virtual viewpoint S, said field comprises only a subsection or sector of the road map data which are situated around the virtual viewpoint S in a circle with the radius or the visual range $r_1$. The representation is limited to a field of view, situated in the driving direction, which corresponds to the natural way of viewing of a vehicle driver.

In order to make more accurate information on distances and scale available to the viewer of the reproduced field of view α, the field of view is provided with a mesh lattice, starting from the virtual viewpoint up to the visual range $r_1$ or the horizon.

The two-dimensionally represented road segments 2 and the three-dimensional background can be represented in this case by NURBS surfaces which are provided with textures.

In the left-hand part of the field of view α, the road map is reproduced in a distinctly brighter fashion, in order to reproduce the direction of the insolation as a function of the time of day. In addition, the region of the strongest curvature is reproduced most brightly. A particularly realistic three-dimensional view is produced by this illumination as a function of curvature.

Figure 4:
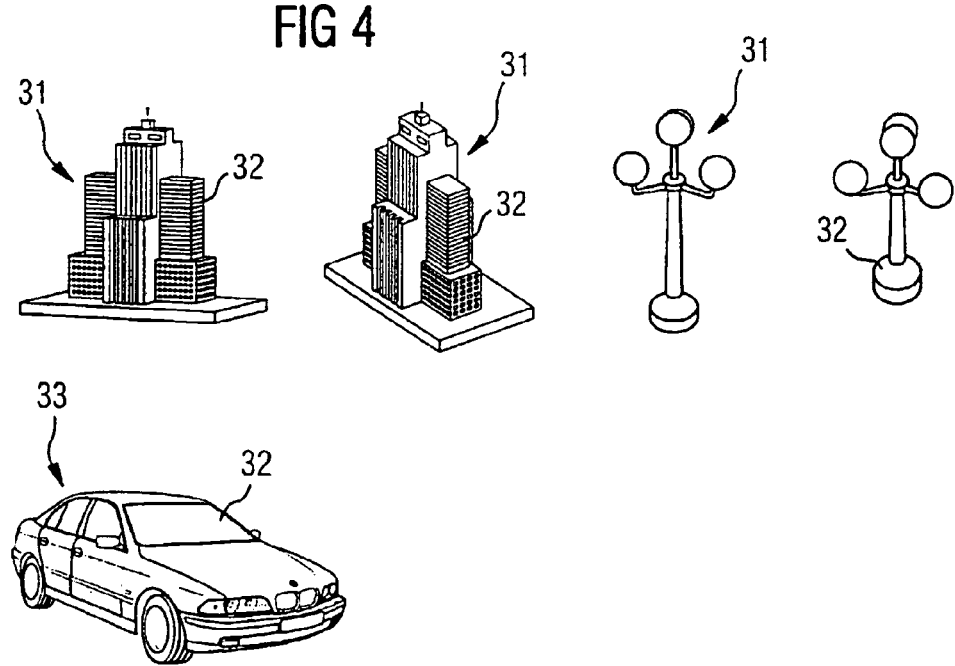
FIG. 4 shows various three-dimensional objects which are intended to be incorporated into a three-dimensional map representation.

FIG. 4 illustrates prominent objects 31 and a vehicle 33, which are stored separately from two-dimensional road map data of a geo information database. The objects 31 are intended for being incorporated into a map representation of the type described in FIG. 3.

A prominent object 31 is incorporated within the map representation with the aid of the correct geo data. As the navigation system and the vehicle in which the navigation system is located approach, the object is enlarged in accordance with the approach.

The objects which are recorded in a map representation are, for example, prominent buildings, towers, houses, bridges, columns, bends, castles, churches, museums, traffic lights, road signs or the like. The prominent objects are stored in a main memory of the navigation system as three-dimensional geometric figures in the form of vector graphics.

The objects are provided with a texture 32 in order to make them appear particularly realistic. The texture is, for example, a scanned image of the relevant object. The texture 32 is laid over the associated three-dimensional object 31. Three-dimensional information of details such as, for example, windows or balconies of a building, are already included in the texture and so the three-dimensional geometric body need only have the basic geometry or contours.

The objects 31 can be rotated, and so in the case of movement along the object, the angle of view onto the object changes in a realistic way.

The vehicle 33 is projected into the field of view in the driving direction directly ahead of the virtual viewpoint. The type of vehicle illustrated and its texture 32 are freely selectable in the navigation system. Consequently, the vehicle 32 illustrated in the field of view can be of the same type as the real vehicle in which the navigation system is installed. In addition, the correct color of vehicle can be selected via the texture 32.

Figure 5:
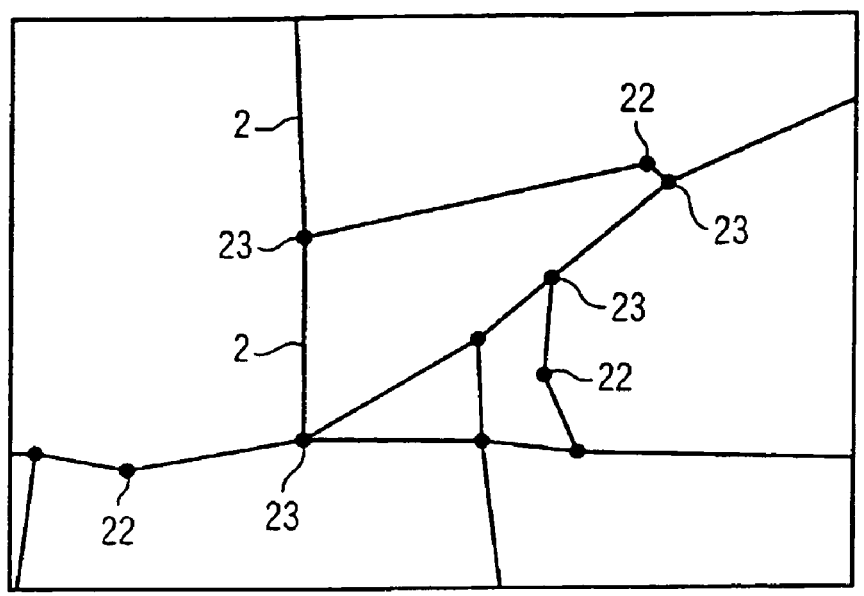
FIG. 5 shows linear road segments of a two-dimensional road map database.

FIG. 5 illustrates a section of a digital road map which comprises two-dimensional road map data with a network of road segments 2. A plurality of juxtaposed road segments have nodes or points of intersection 23. Curves in the line of the road are fixed by shape points.

These two-dimensional road map data are stored on a commercial data medium and constitute the basis for the three-dimensional map representation.

Figure 6:
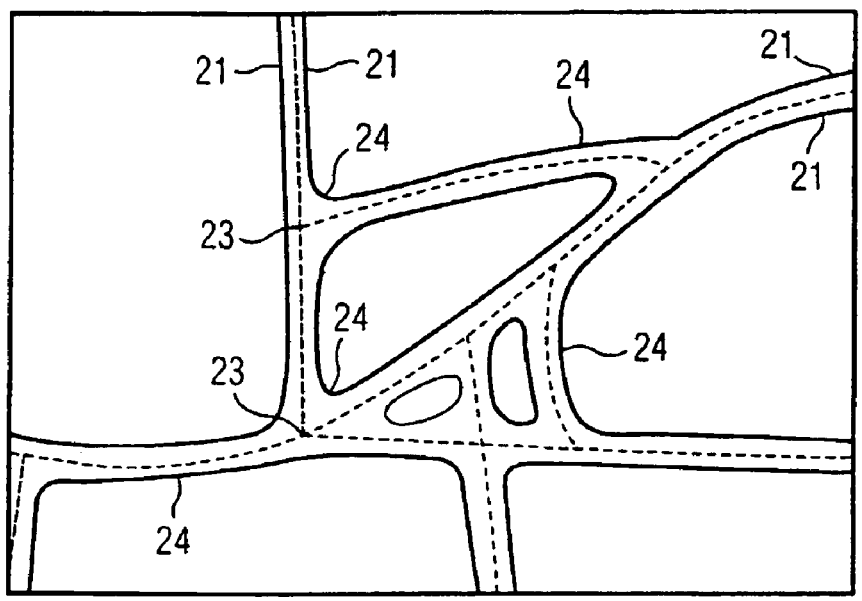
FIG. 6 shows road segments and points of intersection between road segments after their conversion into roads with boundary lines and smoothing of the road contours.

FIG. 6 shows the same section of the digital road map after the road segments 2 have been provided by the conversion unit with boundary lines 21. The boundary lines 21 are interpolated nonlinearly or distorted in the region of juxtaposed road segments 2 or of points of intersection 23. This distortion or bending of the line of the road can be produced, for example, by a Bézier curve or a polynomial interpolation.

The linear or stroke-shaped road segments 2, which are stored in the digital road map, are reproduced as centerlines of the roadways.

By contrast with FIG. 5, at the points of intersection 23 and at shape points 22 the boundary lines no longer meet one another rectilinearly at a specific angle, but have bends or curves 24. The filled surfaces framed by roads are treated in the same way, with the result that the line of the road is smoothed and corners are rounded off.

Figure 7:
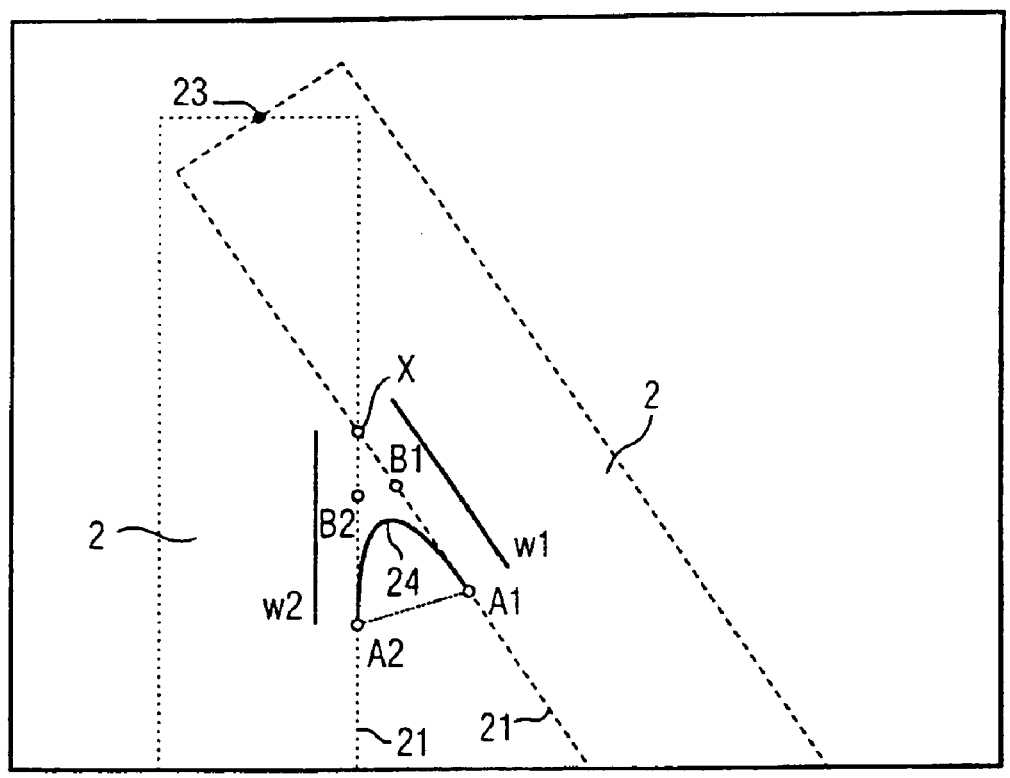
FIG. 7 shows the operation of smoothing the road contours.

FIG. 7 illustrates the smoothing of an angular road contour by means of nonlinear interpolation with the aid of another section from the digital road map. The load segments 2 to be output have been provided again with boundary lines 21. Juxtaposed road segments 2 therefore acquire cornered contours at the interfaces X between their boundary lines 21.

In order to avoid this, the boundary lines 21 are smoothed by means of Bézier curves in regions of juxtaposed road segments 2. The representation of the Bézier curves is performed with the aid of the de Casteljau algorithm. The points b″(t) of the Bézier curve are yielded from:

$$b_i^r(t)=(1-t)b_i^{r-1}(t)+tb_{i+1}^{r-1} \quad (1),$$

where $\{r=1,\ldots,n; i=0,\ldots,n-r\}$ are given by the sequence of points $b_i(i=0,\ldots,n)$ as Bézier points of the Bézier polygon. The points $b_i(i=0,\ldots,n)$ are the control points which are prescribed by the geo coordinates of the road segments and define the course of the line, which is to be interpolated, of a boundary line at the interfaces X. A point on the Bézier curve corresponds to a parameter value t ∈ [0 . . . 1].

The points A1, A2, B1 and B2 represented are the control points $b_i$ prescribed by the geo coordinates. More precisely, A1 and A2 are the end points of the Bézier curve represented. B1 and B2 are Bézier construction points. Furthermore, the prescribable parameters w1 and w2 respectively signify distances for determining the positions of the end points A1 and A2, the starting point in each case being the appropriate interface X.

Figure 8:
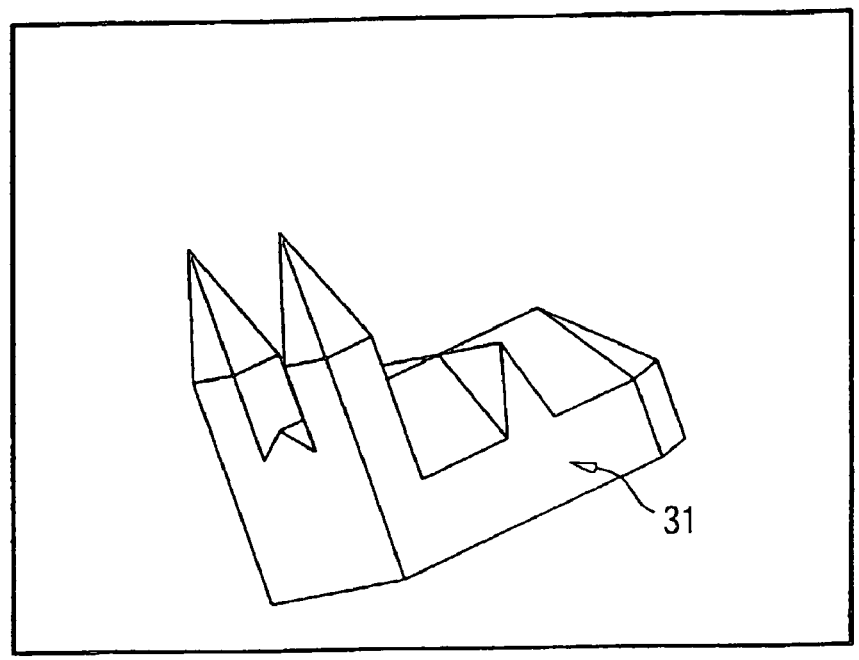
FIG. 8 shows an object before being fitted with a texture.

FIG. 8 shows a three-dimensional geometrical object 31 which is a church.

Figure 9:
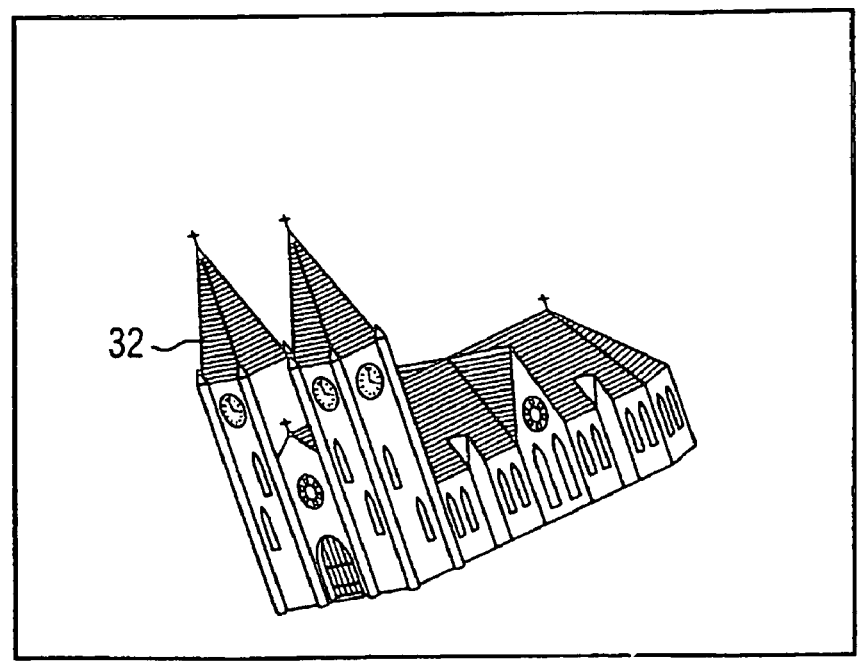
FIG. 9 shows the object of FIG. 8, with texture.

In FIG. 9, the three-dimensional object 31 is provided with a texture 32 which had been obtained by scanning a photograph of this object. The texture contains detailed information on the object such as doors, windows, projections and the like. This detailed information is available in only two dimensions and is not transferred into a three-dimensional structure. Providing the three-dimensionally prepared object 31 with the texture is enough to produce a convincing three-dimensional effect.

Figure 10:
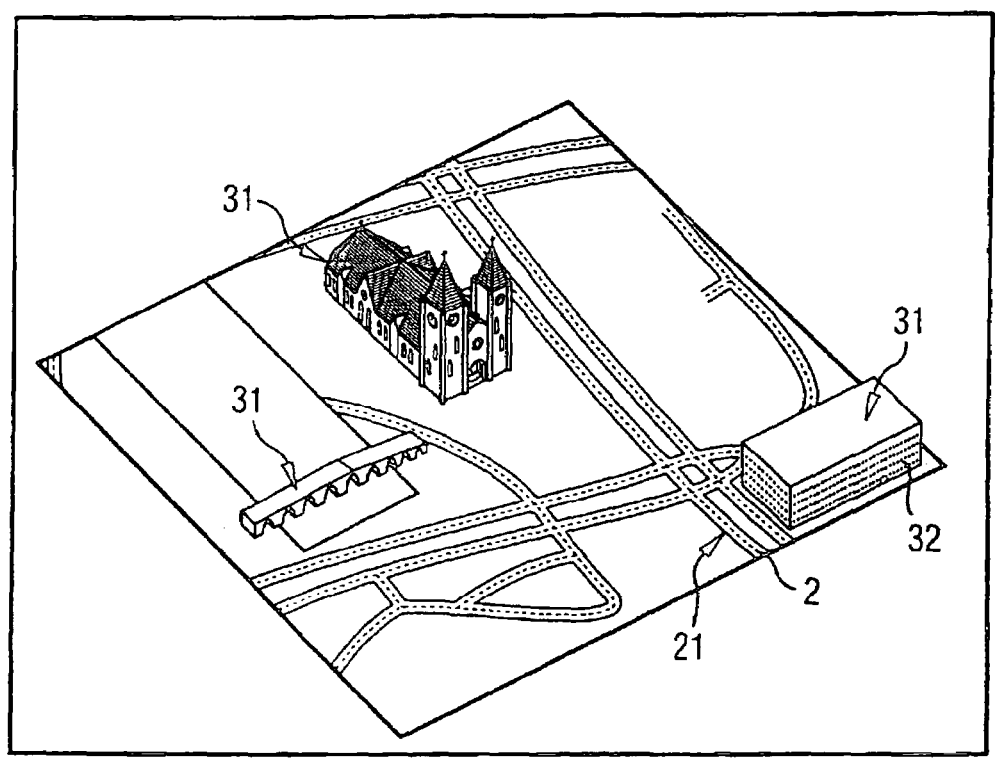
FIG. 10 shows the object of FIG. 9 set in a road map.

FIG. 10 shows a section of a road map to be output after the incorporation of three-dimensional objects 31 and before the transformation of the plane to be represented into a three-dimensional view.

The objects 31 are already provided with the appropriate textures. The road segments 2 are fitted with boundary lines 21 and with smoothed edges.

Figure 11:
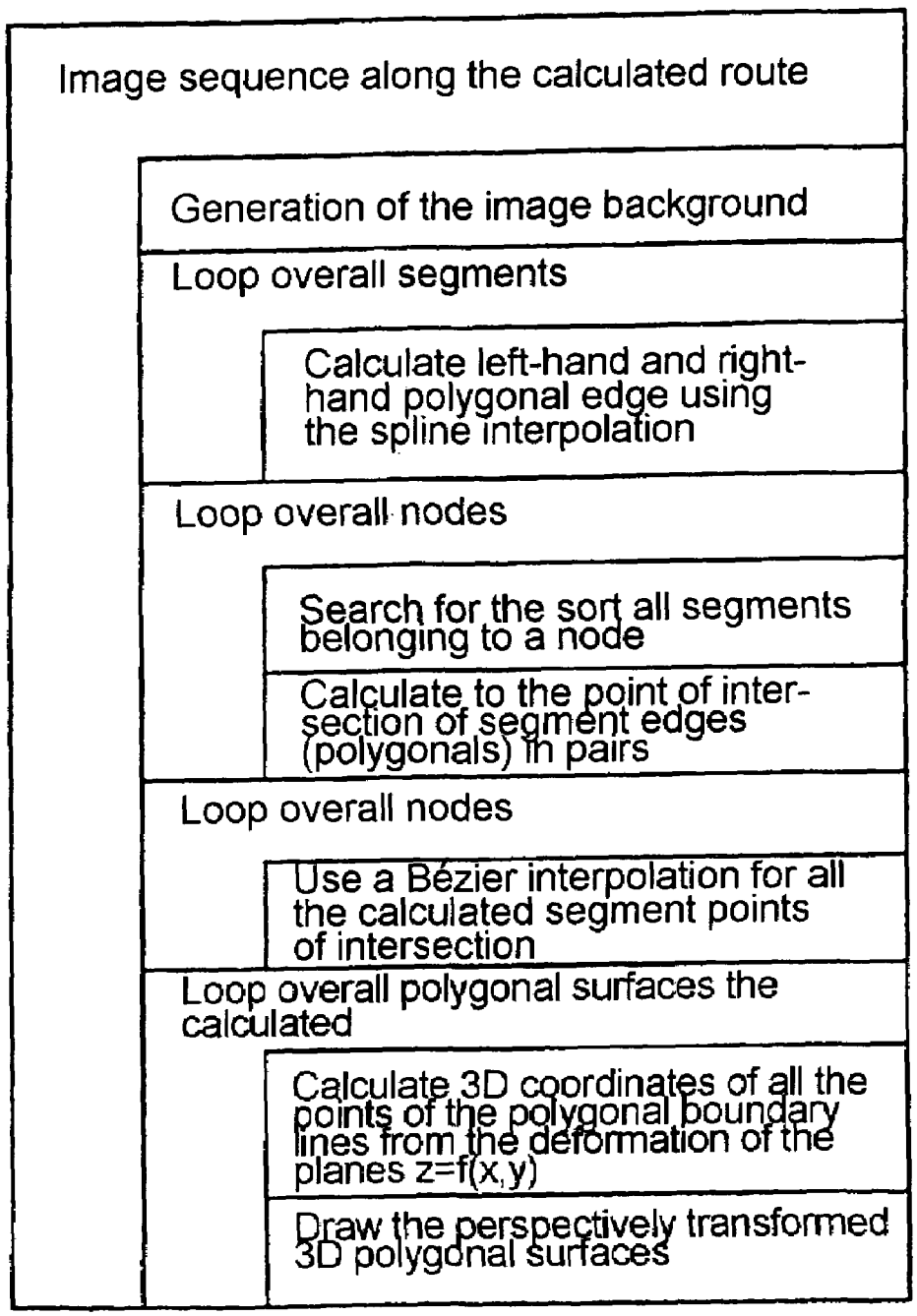
FIG. 11 shows a flowchart for generating a 3D image output.

The sequence of the conversion of the initial data into a 3D representation of a road map view is shown in FIG. 11.

The specified steps are executed for each representation of an image sequence of a route calculated by the navigation system, in order to generate a curved three-dimensional surface.

The first step is to generate the image background for a first representation.

Subsequently, the right-hand and the left-hand road boundary line (polygonal edge) are determined for all road segments to be illustrated using the spline interpolation. The spline interpolation removes edges in the line of the road.

Thereafter, the points of intersection (nodes) of the road segments are calculated. The road boundary lines are distorted at the points of intersection of the juxtaposed roads with the aid of Bézier interpolation, in order to round off or smooth corners of juxtaposed road segments.

Thereafter, the plane thus found, which consists of a multiplicity of polygonal surfaces which represent the image background and the road segments, is transferred into a three-dimensional representation. A small number of NURBS can be used as an alternative to the polygonal surfaces. The three-dimensional coordinates of all the points of the boundary lines of the polygonal surfaces, or the NURBS are determined by the deformation of the plane by means of polygonal transformation. The result obtained is output by means of perspective projection onto a display device.

What is claimed is:

1. A method for obtaining a three-dimensional map representation for a navigation system from two-dimensional road map data having a network of road segments, comprising:

obtaining a field of view from the two-dimensional road map data, wherein the field of view is determined by a plane in a form of a sector of a circle around a virtual viewpoint, and a radius of the circle corresponds to a predetermined visual range; and transforming the plane into a third dimension using a polynomial function such that the plane is concave in shape the polynomial function being $z=\Sigma_i a_i * r^i; r=[(x-x_p)+(y-y_p)^2]^{1/2}$.

2. The method as claimed in claim 1, wherein the virtual viewpoint is determined continuously by the navigation system, and the field of view is moved synchronously with the virtual viewpoint.

3. The method as claimed in claim 1, wherein objects are placed in the field of view as three-dimensional geometric bodies.

4. The method as claimed in claim 3, wherein the objects are provided with a texture.

5. The method as claimed in claim 1, wherein the vehicle is represented in the field of view.

6. The method as claimed in claim 1, wherein the field of view is illuminated as at least one of a function of the time of day and the curvature of the represented sections.

7. The method as claimed in claim 1, wherein a meshed network is displayed.

8. The method as claimed in claim 1, wherein route segments of the road map data are provided with boundary lines, and the boundary lines are distorted into a curved course in the region of juxtaposed road segments.

9. The method as claimed in claim 1, wherein the filed of view is curved in the shape of a dish.

10. A navigation system, comprising:

a display device;

a position-determining unit;

a storage medium on which two-dimensional road map data is stored with the aid of a network of road segments; and a conversion unit to convert from the two-dimensional road map data a field of view, which is determined by a plane in a form of a sector of a circle around a virtual viewpoint, wherein a radius of the circle corresponds to a predetermined visual range, into a three-dimensional view by using a polynomial function such that the plane is concave in shape, the polynomial function being $z=\Sigma_i a_i * r^i; r=[(x-x_p)+(y-y_p)^2]^{1/2}$.

* * * * *